US012793063B2

United States Patent
Joshi

(12) United States Patent
(10) Patent No.: US 12,793,063 B2
(45) Date of Patent: Nov. 10, 2026

(54) SYSTEMS AND METHODS FOR IDENTITY VERIFICATION REUSE

(71) Applicant: Stripe, LLC, San Francisco, CA (US)

(72) Inventor: Akshay Joshi, Ottowa (CA)

(73) Assignee: Stripe, LLC, San Francisco, CA (US)

( * ) Notice: Subject to any disclaimer, the term of this patent is extended or adjusted under 35 U.S.C. 154(b) by 642 days.

(21) Appl. No.: 17/079,984

(22) Filed: Oct. 26, 2020

(65) Prior Publication Data

US 2022/0131854 A1 Apr. 28, 2022

(51) Int. Cl.
*G06Q 20/40* (2012.01)
*H04L 9/40* (2022.01)

(52) U.S. Cl.
CPC ......... *G06Q 20/40* (2013.01); *H04L 63/0815* (2013.01); *G06Q 2220/00* (2013.01)

(58) Field of Classification Search
CPC .............. G06Q 20/40; G06Q 2220/123; H04L 67/306; H04L 63/08; H04L 63/0815
See application file for complete search history.

(56) References Cited

U.S. PATENT DOCUMENTS 11,144,923 B1 * 10/2021 Griffith ................ G06Q 20/123
11,218,480 B2 * 1/2022 Rolfe .................. H04L 63/0861
11,605,083 B1 * 3/2023 Sureka ................ H04L 63/0861
12,022,282 B2 * 6/2024 Rolfe .................... H04L 9/3242
2014/0337513 A1 * 11/2014 Amalapurapu .... G06Q 30/0269 709/224
2017/0357976 A1 * 12/2017 Malik ................. H04L 63/0807

FOREIGN PATENT DOCUMENTS

EP 3393131 A1 * 10/2018 ....... H04N 21/41265

OTHER PUBLICATIONS

Mundada; Half-Baked Cookies: Hardening Cookie-Based Authentication for the Modern Web; Proceedings of the 11th ACM on Asia Conference on Computer and Communications Security, 2016, p. 675-685.*

* cited by examiner

*Primary Examiner* — Ilse I Immanuel
(74) *Attorney, Agent, or Firm* — Foley & Lardner LLP

(57) ABSTRACT

A method and apparatus for providing secure and efficient identity verification reuse to a user of a commerce platform are described. The method may include receiving a first set of user data associated with the user from a merchant system for identity verification of the user, and a second set of user data associated with the user, the second set of user data to verify a purported identity of the user. The method may also include verifying the purported identity of the user as a true identity of the user based on the first set of user data and the second set of user data. Furthermore, the method can include in response to a positive verification of the identity of the user, generating a cookie having an identifier and collecting a second authentication factor generated by a user device of the user, wherein the identifier of the cookie is associated with the second authentication factor by the commerce platform for identity verification reuse.

23 Claims, 6 Drawing Sheets

SYSTEMS AND METHODS FOR IDENTITY VERIFICATION REUSE

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc. Because the agent will perform services and/or provide goods for which financial transactions will be performed, and handle sensitive customer information, the merchant generally verifies the purported identity of the agent prior to enabling that agent to act on the merchant's behalf. The identity verification may include the agent supplying information (e.g., personal information) and/or documentation (e.g., images and/or copies of government identification, utility bills showing their name and/or address, etc.) as proof that the agent is who they say they are.

These merchants, although providing a system for supplying products and/or services to consumers through their agents, often do not perform the financial processing associated with the merchant-consumer transactions. Instead, merchants utilize commerce systems to process financial transactions for the products and/or services provided to consumers through their agents. This may include the merchant, agent, and other users establishing accounts with the commerce system, in addition to agent accounts with the merchant. Once the accounts are established, merchants can run financial transactions using the services of the commerce system, the agents can accept payments from customers on behalf of the merchant for provided products and/or services, and the commerce system processes the accepted payments, performs payouts for services rendered, as well as other financial processing services. This processing may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant Establishing accounts, referred to as onboarding, for new users to a commerce system and/or the merchant is often associated with significant problems and potentially presents barriers to onboarding a new user. Of particular importance where agents sign up for merchant and/or commerce platform accounts is the issue of identity verification noted above. Thus, the agent generally performs one or more operations to establish their identity for a particular merchant. When the agent attempts to establish an account with other merchants, the agent is again required to perform identity verification. Thus, agents that perform services for multiple merchants perform multiple, and often similar/identical, identity verification processes that consume the agents time, merchant and/or commerce platform system bandwidth, and computing resources. Furthermore, agent's that are required to perform the same identity verification processes for multiple merchants may opt out of additional identity verification processes as time consuming, repetitive, risky to their personal information, etc., thereby potentially reducing additional merchants access to agents and lost business.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
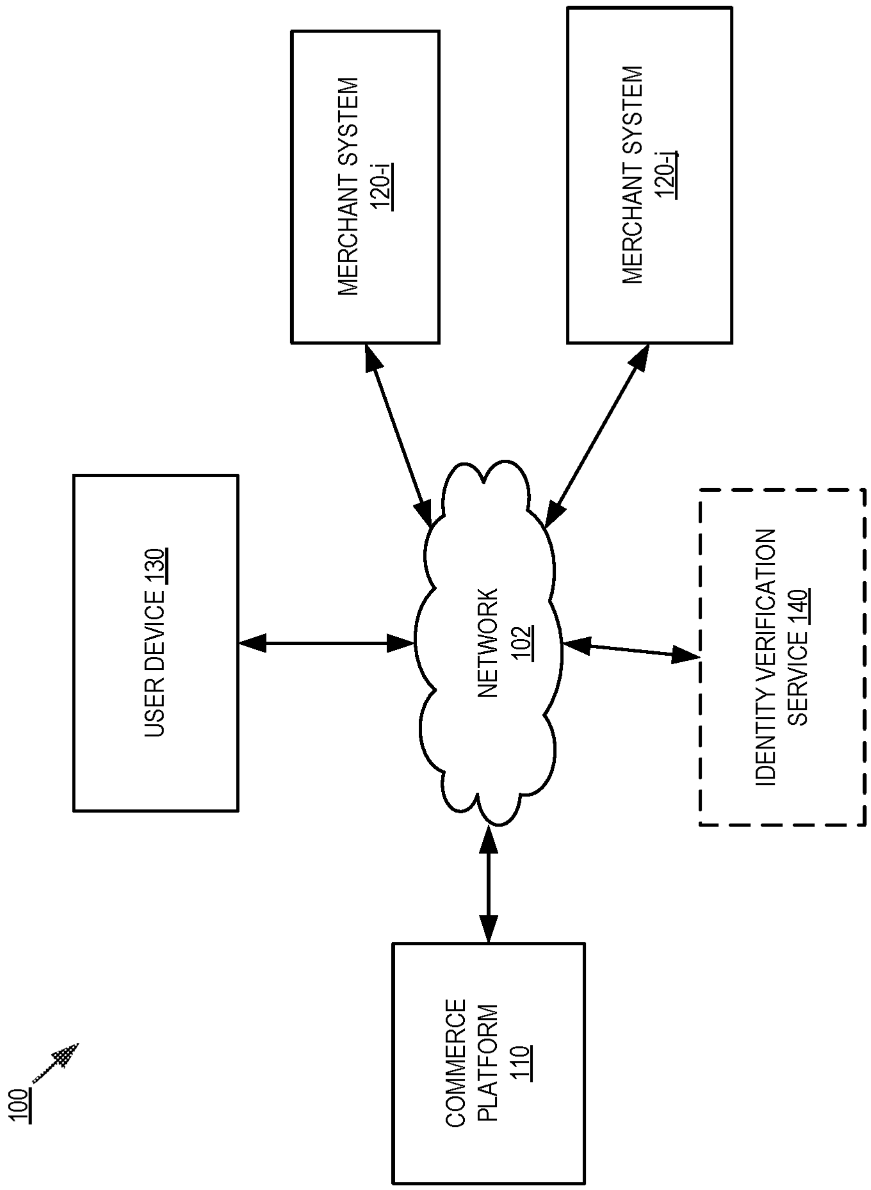
FIG. 1 is a block diagram of an exemplary system architecture for providing secure and efficient identity verification reuse to a user of a commerce platform.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "verifying", "associating", "depositing", "returning", "detecting", "querying", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for providing secure and efficient identity verification reuse to a user of a commerce platform. In one embodiment, the system 100 includes a commerce platform 110, a plurality of merchant systems 120-*i* through 120-*j*, user device 130, and an optional identity verification service 140.

In one embodiment, user device 130 may be a mobile computing device, such as a smartphone, tablet computer, smartwatch, etc., as well computer systems, such as a desktop computer system, laptop computer system, server computer systems, etc. The commerce platform 110, merchant systems 120, and identity verification service 140 may also be one or more computing devices, such as one or more server computer systems, desktop computer systems, etc.

The commerce platform 110, merchant systems 120, user device 130, and identity verification system 140 may be coupled to a network 102 and communicate with one another using any of the standard protocols for the exchange of information, including secure communication protocols. In one embodiment, one or more of the commerce platform 110, merchant systems 120, user device 130, and identity verification system 140 may run on one Local Area Network (LAN) and may be incorporated into the same physical or logical system, or different physical or logical systems. Alternatively, the commerce platform 110, merchant systems 120, user device 130, and identity verification system 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides financial processing services to one or more merchants, such as the merchants associated with merchant systems 120-*i* through 120-*j*. Such financial processing services that commerce platform 110 provides to merchant systems 120-*i* through 120-*j* can include, for example, managing accounts, running financial transactions, clearing transactions, performing payouts to agents, tracking tax information, managing merchant and/or agent accounts, as well as other services typically associated with commerce platforms systems such as, for example, STRIPE™. Furthermore, in embodiments, commerce platform 110 additionally performs identity verification for the agents of merchant systems 120. That is, when an agent, such as a user of user device 130, establishes an account with merchant system 120-*i*, and accordingly with commerce platform 110 to provide goods and/or service on behalf of merchant system 120-*i*, commerce platform 110 performs identity verification on behalf of the merchant system 120-*i*. In other words, a merchant system for which an agent is being onboarded delegates identity verification to the commerce platform 110. The identity verification process performed according to the embodiments discussed herein establishes the validity of a purported identity of the user of user device 130 as being or not being the user who they claim to be, and commerce platform 110 returns an identity verification result to merchant system 120-*i*. Merchant system 120-*i* may beneficially rely on the identity verification performed by commerce platform 110, which reduces application complexity, development time, and maintenance of merchant applications to which an agent communicates with merchant system, and reduces computation loads placed on merchant system 120-*i* (e.g., one or more servers processing merchant system applications).

Furthermore, as will be discussed in greater detail below, after a user of user device 130 successfully has her identity verified by commerce platform 110, when she later seeks to establish a second account with a different merchant, such as merchant system 120-*j*, and accordingly with commerce platform 110 to provide goods and/or service on behalf of merchant system 120-*j*, commerce platform 110 having already performed an identity verification of the user of user device 130 may perform an identity verification reuse process to more efficiently perform identity verification for the onboarding to merchant system 120-*j*. That is, commerce platform 110 leverages the prior identity verification and the trust established in the identity verification to avoid performing an entire second identity verification. By enabling identity verification reuse, as discussed herein, commerce platform 110 is therefore able to accelerate the speed at which user of user device 130 is onboarded to additional merchants (e.g., merchant 120-*j*), reduce bandwidth consumption by eliminating the need to of a user to transmit additional and/or repetitive identity verification documentation, data, etc., reduce computer time on server systems that would process additional identity verification operations, as well as other benefits discussed herein. Thus, the identity verification reuse improves not only user experience by speeding up onboarding to additional merchant systems, but also improves resource usage (e.g., computer time, server resources, bandwidth, etc.) for both the commerce platform 110 and merchant systems 120. Additionally, by avoiding future identity verifications, the user is able to avoid further transmissions of their sensitive information over network 102, leading to improved data security while maintaining the trust in the identity verification performed by commerce platform 110.

In embodiments, before providing services on behalf of an initial merchant system 120-*i*, the user device 120 participates in an onboarding process in which a user of the user device 120 initially interacts with merchant system 120-*l* (e.g., via a merchant's mobile app, website, etc.) to provide user account data. However, prior to establishing an account, the user's identity is subject to verification by the merchant system 120-*i*. In embodiments, merchant system 120-*i* utilizes the commerce platform 110 to perform the identity verification prior to completion of account establishment. In embodiments, merchant system 120-*i* exchanges messages with commerce platform 110, such as using one or more application programming interface (APIs) of the commerce platform 110. The messaging may establish a secure connection between the merchant system 120-*i* and the commerce platform 110, for initializing a new account, and the merchant system 120-*i* sending a first set of data to start an identity verification process as a precondition for approval of the new user account. The first set of data, in embodiments, is a minimal set of data that will enable a verification process to be initiated. In embodiments, the first set of data includes at least a name of the user of user device 130, birthdate, physical address, the user's country, a country of the commerce platform's operation for the merchant, a country of the merchant system, as well as other information or a combination of these. Additional user information, such as the user's birthdate, a portion of a government issued ID (e.g., last four digits of a social security number), an address where a user may be contacted (e.g. a mobile device number, an email address, a social network address, etc.), as well as other information, may also be included.

In embodiments, upon receiving the first set of user data, the commerce platform 110 initiates an identity verification for the user of user device 130 on behalf of merchant 120-*i*. The process of identity verification can occur in different embodiments. First, commerce platform 110 may generate one or more user interfaces that populate a frame or window of a user interface generated by merchant system 120-*i*. For example, merchant 120-*i* may be onboarding a new user via a mobile app, web page, etc., and commerce platform 110 performs identity verification within pages that populate the mobile app, web page, etc. Second, commerce platform 110 may alternatively receive, in the first set of data, an address (e.g. phone number, email address, physical/mailing address, etc.) associated with user of the user device 130. Commerce platform 110 may then send a link to the address (e.g. email message, text message, MMS message, letter with a code/link, etc.) where the link resolves at commerce platform 110, from which commerce platform 110 serves identity verification user interfaces directly to the user device 130 (e.g., via a web browser of the user device 130). In embodiments, the user interfaces are served via commerce platform 110 using secure protocols for the exchange of information.

In either embodiment, commerce platform 110 requests authorization from user of user device 130 and receives acknowledgement that commerce platform 110 will perform identity verification on behalf of the merchant system 120-*i*. Once the user has confirmed their authorization, commerce platform collects a second set of user data from the user device 130 as provided by the user through one or more identity verification user interfaces generated and/or served by commerce platform 110. The second set of user data received by commerce platform 110 via the interface(s) may include, for example, a driver's license number, an image of the driver's license, a government issued identification number (e.g. a social security number), a current address, visa number, work authorization numbers, IP address and associated metadata, user name at the commerce platform, email address, telephone number, as well as other information and/or a combination of these. Furthermore, in embodiments, each merchant system may define the level of identity verification to be performed (e.g., verification with high degree of certainty, moderate certainty, minimal certainty, etc.), define the documents to be used to perform verification (e.g., only collect and verify a driver's license image), or otherwise configure the verification to be performed based on a false identity verification risk acceptable to the merchant system (e.g., merchant is OK with an identity verification that is only 75% likely to be accurate, 95% likely to be accurate, 99% likely to be accurate, etc.). That is, in embodiments, a merchant system may configure how and with what level of certainty an identity verification is to be performed.

Once the second set of user data is collected, in an embodiment, commerce platform 110 provides the collected user data (e.g. the first set and the second set of user data, as well as previously collected information such as shipping addresses, names, IP address, etc. for a user's past orders via the commerce platform) to an identity verification service 140, such as LEXISNEXIS™, TELESIGN™, ONFIDO™, etc. The communication of the user data is again performed over secure communication channels and/or using secure communication protocols to safeguard the sensitive user data. The identity verification service 140 then performs an identity verification, such as querying governmental databases, private databases, etc. to verify the authenticity, accuracy, and how up-to-date the supplied user data is. The identity verification service 140 returns a verification result (e.g. positive verification, negative verification, verification score such as likelihood of positive verification, risk indicator (e.g., when user data is found on a watch list, list of previous fraudsters, etc.) etc.) to the commerce platform 110, which in turn provide the verification result and/or score of the verification of the user of user device 130 to the merchant system 120-*i*. In embodiments, where a level of verification is configured by the merchant system 120-*i*, commerce platform may provide the merchant with the verification result based on that configuration. For example, if a merchant is satisfied with a 75% likely verification, but the resulting verification is 74% likely to be accurate, commerce platform would return a negative identity verification result halting the user onboarding process and/or triggering a second verification process in which a user of user device 130 could supply additional user data set(s), correct prior supplied data, etc. Conversely, if a merchant is satisfied with a 75% likely verification, but the resulting verification is 76% likely to be accurate, commerce platform would return a positive identity verification result allowing the onboarding to continue.

Identity verification service 140 is illustrated in dashed line because, in embodiments, commerce platform 110 may perform identity verification as discussed herein.

Furthermore, in response to a positive verification, commerce platform 110 queries the user or user device 130 whether they would like to enable identity verification reuse for more efficient identity verification with subsequent merchant systems 120-*j*. If agreed to by the user of user device 130, commerce platform will generate a cookie with a unique identifier (e.g., a cryptographic string, random number, hash of user data, etc. unique to the user of user device 130). The cookie is a piece of data that is deposited on the user device 130 that includes the identifier as well as other information that the commerce platform 110 may use to identify the user of user device 130. In embodiments, the identifier is encrypted by a key of the commerce platform 110 prior to being deposited on the user device 130. Furthermore, commerce platform may collect a second authentication factor from the user of user device 130. Such a second factor may be a biometric signature generated by the user device 130 (e.g., a facial ID signature, fingerprint signature, etc.), a device confirmation of a device stored biometric identifier (e.g., device attestation that a face, fingerprint, etc. recognition was successful), a hash value, key, or other data securely generated by a trusted platform module (TPM) based on device state, software, etc., universal $2^{nd}$ factor (U2F) tokens, fast identity online (FIDO) authentication, or other secure second verification factors which user device 130 is capable of generating.

Commerce platform 110 collects the second authentication factor and stores an association between the ID of the cookie and the second authentication factor in a user account initialized at commerce platform 110. Thus, the user's commerce platform account for performing services on behalf of merchant system 120-*i* will include the association between the cookie ID and the second authentication factor. Once the association is created, commerce platform 110 deposits the cookie on the device 130. As will be discussed below, the device cookie with the ID and the second authentication factor will enable secure and trusted identity verification reuse, leading to the benefits discussed herein.

In an embodiment, when user of user device 130 seeks to be associated with merchant 120-*j* to provide goods or services on behalf of that merchant, merchant 120-*j* will similarly perform an onboarding process in which they will supply commerce platform 110 with a first set of user data via API based messaging, as discussed above. However, instead of then generating a set of user interfaces for collecting a second set of user data for identity verification, commerce platform 110 will utilize the first set of user data received from merchant system 120-*j* to determine whether prior identity verifications have been successfully performed. That is, commerce platform 110 will utilize the received user data to determine if there are any accounts at commerce platform 110 that have a same name, birthdate, phone number, etc. of an existing account, and whether an identifier (e.g., a device cookie ID) is associated with a collected second authentication factor. When none is found, and the user is a new user to commerce platform 110, or did not previously successfully perform an identity verification, the process discussed above for performing identity verification is repeated for merchant system 120-*j*.

However, when an existing user account is found (e.g., a match in the first set of data with user data in an existing account) and the account has a cookie ID associated with a second factor authentication, commerce platform requests and obtains an ID from a device cookie deposited on user device 130. Commerce platform further collects the second authentication factor from the user device 130 for the user (e.g., biometric signature, TPM generated data, etc.). When the ID from the cookie and the second authentication factor obtained from the user device 130 match the associated cookie ID and second authentication factor stored by commerce platform 110, commerce platform 110 concludes that the user has previously successfully verified her identity, that the collected information (e.g., ID and second authentication factor) are from the previously verified user and user device 130, and the strong second authentication factor can be trusted in identifying the user of user device 130. Based on this, commerce platform 110 is able to verify the identity of the user of user device 130 to commerce platform 120-*j* without having to re-perform the identity verification process, where the positive identify verification result is returned to the merchant system 120-*j*. Beneficially, the verification time for merchant 120-*j* is significantly decreased thereby reducing computation time and network bandwidth consumption, while preserving the strong verification results. Additionally, by avoiding the need to re-authenticate (e.g., seek to collect user data for providing to a third party service), user data security is enhanced by preventing unintended exposure.

After identity verification to either merchant system, for example after commerce platform 110 has deposited a device cookie with a unique ID associated with user device 120, collected a second authentication factor from the user of user device 130, and created an association between the data at commerce platform 110, in one embodiment, commerce platform 110 queries user of user device 130 whether they would like to enroll their other device(s) for identity verification reuse. For example, commerce platform 110 can inform user that by enrolling other devices, identity verification efficiencies can be expanded to any device of the user during future verification(s) with other merchants. Upon receiving consent from the user to enroll additional devices, which may include device identifiers (e.g., telephone numbers of mobile device) or user identifiers (e.g., email address, social media address, or other point of user contact), commerce platform 110 transmits a link to the other device for enrollment with for identity verification re-use. For example, commerce platform may send a text message, MMS message, email, etc. with a link having an embedded identifier associated with the request to enroll another user device. The identifier in the link may be short lived (e.g., expiring) and/or single use, such that when commerce platform receives link selection, validity of the link and the embedded identifier are checked to determine if the link is still valid (e.g., verification that the ID in the link has not expired, has not been previously used, etc.) and to which user (e.g. user of user device 130) the request is originating from.

In embodiments, the link is selected form the other, second user device so that a reduced version of the verification process can be performed. Specifically, commerce platform 110 will serve one or more user interfaces to the other, second user device to collect a second authentication factor for the second device and deposit a device cookie with an ID (e.g., either the same or other ID) on the other, second device. Commerce platform 110 may then make another association between the cookie ID and the second authentication factor in the user's account at commerce platform 110. Then, the second device is enabled for identity verification reuse as discussed above. For example, when user of user device 130 seeks to have their identity verified to merchant 120-*j* during onboarding, the user may perform identity verification reuse from either user device as both user devices have device cookies with IDs (either the same device cookie ID or different) and second authentication factors associated with the device cookies, and use the association as discussed above.

In embodiments, the enrollment of the other, second user device may be performed synchronously with the enrollment of user device 130. In this embodiment, the first user device 130 may be queried upon receiving the user link selection and verifying the validity of the link, whether the user initiated the second device's enrollment to the user's commerce platform account. That is, user may be provided with additional security measures, such as requiring user acknowledgement that she initiated subsequent device enrollment, link validity verification, etc. to ensure user account security. This option for synchronous enrollment of additional user devices improves security as the second device is enrolled during the time of verification, and without time for nefarious actors to intervene.

In embodiments, the enrollment of the other, second user device may be performed asynchronously at a later time. In this embodiment, the link validity period is provided with an extended duration by the commerce platform 110 (e.g., 1 day, 7 days, etc.). Furthermore, the query to the initially enrolled user device 130 could still be performed by commerce platform 110 to ensure that the previously enrolled/trusted user device 130 and associated user are responsible for enrolling the second device in the user's account. Such additional device enrollment further improves user experience, and distributes the trusted identity verification in a secure way to additional devices. This option acknowledges modern device usage of users, which frequently and interchangeably use multiple devices, such as smartphones, laptops, smart watches, et.

Figure 2:
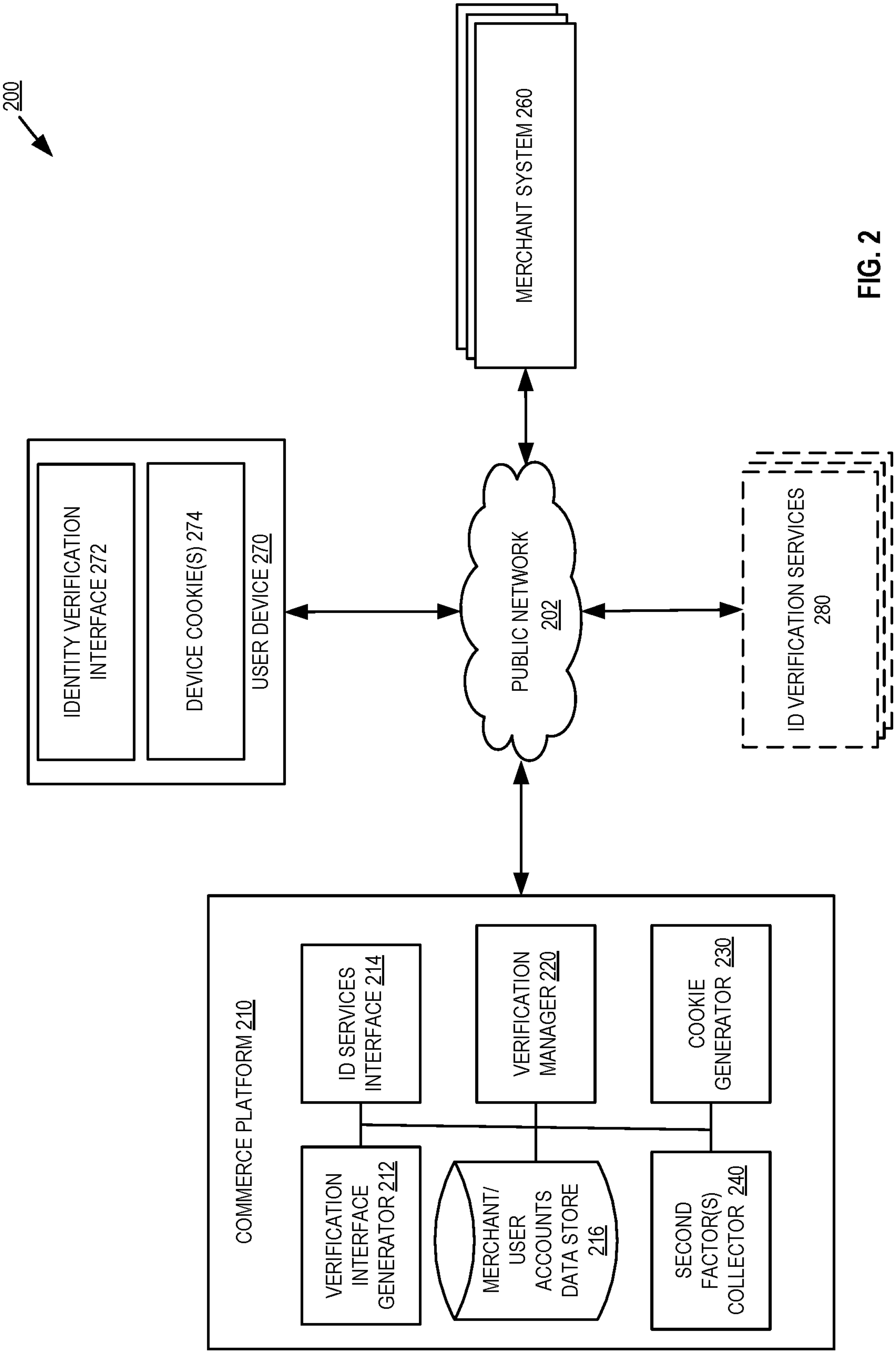
FIG. 2 is a block diagram of one embodiment of a commerce platform providing secure and efficient identity verification reuse.

FIG. 2 is a block diagram of one embodiment 200 of a commerce platform system 210 providing secure and efficient identity verification reuse. Commerce platform system 210, merchant systems 260, user device 270, and identity verification services 280 provide additional details for the corresponding devices/systems discussed above in FIG. 1.

In one embodiment, commerce platform 210 includes a verification manger 220, cookie generator 230, verification interface generator 212, identity verification services interface 214, second factor(s) collector 240, and a merchant/user accounts data store 216. User device 270 is a device of a user seeking to enroll and provide goods or services to a merchant system 260.

Thus, in embodiments, verification manager 220 receives a first set of user data (e.g., a minimal set of data with identification information of the user of user device 270) from merchant system 260 or from user device 270. For example, user device 270 may be participating in an onboarding with merchant system 260, and merchant system collects the first set of user data, which is provided by API based messaging with verification manger 220 to initiate identity verification. Similarly, an application (e.g., mobile app, web page, etc.) may be configured to initiate API based messaging directly with verification manager 220 to communicate the first set of user data.

Upon receipt, verification interface generator 212 generates user interface data (e.g., a web based user interface, data to populate a mobile app, etc.), which is provided to user device 270, and illustrated as identity verification interface 272. Identity verification interface 272 prompts the user for a second set of user identification data (e.g., social security information, images of government issued IDs, information only a user would know (e.g., mother's maiden name, street address, mortgage provider, etc.)).

After receipt of the second set of user data, ID services interface 214 transmits the collected user data (e.g., first and second sets) to ID verification services 280. ID verification services 280 then performs verification of the information to correlate the supplied user data with the purported user identity from the collected user data, for example by querying public/private databases. In embodiments, ID verification services 280 may be implemented by commerce platform 210, as discussed above. In either embodiment, the result of the ID verification is provided to verification manager 220 which transmits a corresponding identity verification result (e.g., affirmative or negative identity verification) to merchant system 260 and user device 270.

Furthermore, in response to an affirmative/positive identity verification result, verification manager queries user of user device 270 via identity verification interface 272 for consent to enable identity verification reuse. When consent is given, cookie manager generates an identifier that is inserted into a device cookie (e.g., a random number, hash of user data seeded with a salt to obfuscate the user data, cryptographic string, etc. inserted into an electronic cookie). Furthermore, second factor(s) collector 240 collects, by querying user device 270 for a second authentication factor, such as a biometric signature, hash generated by a TPM, key, etc. generated by user device 270. Upon receiving the second authentication factor, verification manager 220 creates an association between the ID of the device cookie with the collected second authentication factor in an account for the user of user device 270 in merchant/user accounts data store 216. Furthermore, the user account may be associated with merchant system 260 for which the user is being onboarded, etc. Then verification manger 220 deposits the cookie with the ID in user device 270 (e.g., device cookie(s) 274)).

Furthermore, as discussed herein, user of user device 270 may be queried to enroll a second user device (not shown). When, verification manager 220 receives an affirmative request, verification interface generator 212 generates additional user interface to collect identification information for the second user device (e.g., phone number, email, etc.), and a sends a link for enrollment of the second user device. Then, as discussed above, either a synchronous or asynchronous identity verification reuse is performed by generation of a second device enrollment identifier embedded within the link, and transmission of the link to the second user device. As discussed herein, the ID may be short lived/expiring/single-use, which requires the user to select the link with the ID within a set amount or number of times (e.g., within 1 minute, 5 minutes, one day, once, etc.). When link selection resolves at commerce platform 210, verification manager 220 may confirm validity of the ID in the link before having verification interface generator 212 generate interface(s) (e.g., web, application, etc.) for transmission to the second user device. Additional security, such as querying user device 270 whether enrollment has been activated by the user at the second user device may also be performed.

In response, verification manager 220 instructs cookie generator 230 to generate a device cookie for the second user device and second factor(s) collector 240 to collect a second user authentication factor from the second device. In embodiments, the identifier for the second device cookie may be the same as the originally generated device cookie, or may be different for each enrolled device. Furthermore, the second authentication factor collected from the second device may be the same or different type of authentication factor. In any embodiment, the ID from the cookie for the second device is associated with the collected second authentication factor to enroll the second user device for identity verification reuse.

In embodiments, verification manager 220 may receive an identity verification request with a first set of user data from a second merchant system 260 for user of user device 270 (or second user device, not shown). Verification manager 220 uses the first set of user data to determine if a user account exists in data store 216 (e.g., matching name, birthdate, telephone number, etc.). When a match is found, verification manager 220 queries user device for the ID from device cookie 274, and second factor(s) collector 240 collects a second authentication factor from user device 270 (e.g., biometric ID, TPM checksum, TPM key, etc.). Verification manager 220 then determines whether the collected second authentication factor matches the cookie ID as stored in data store 216. When a match is found, the user device 270 and the associated user are verified as having previously successfully performed an identity verification, and the successful result is returned to the second merchant system 260 and user device 270. Thus, the user of user device 270 is authenticated to the second merchant without having to perform the entire identity verification process. When a match is not found, the user of user device 270 is considered a new user, and the identity verification process discussed above is initiated for the user of user device 270.

Figure 3:
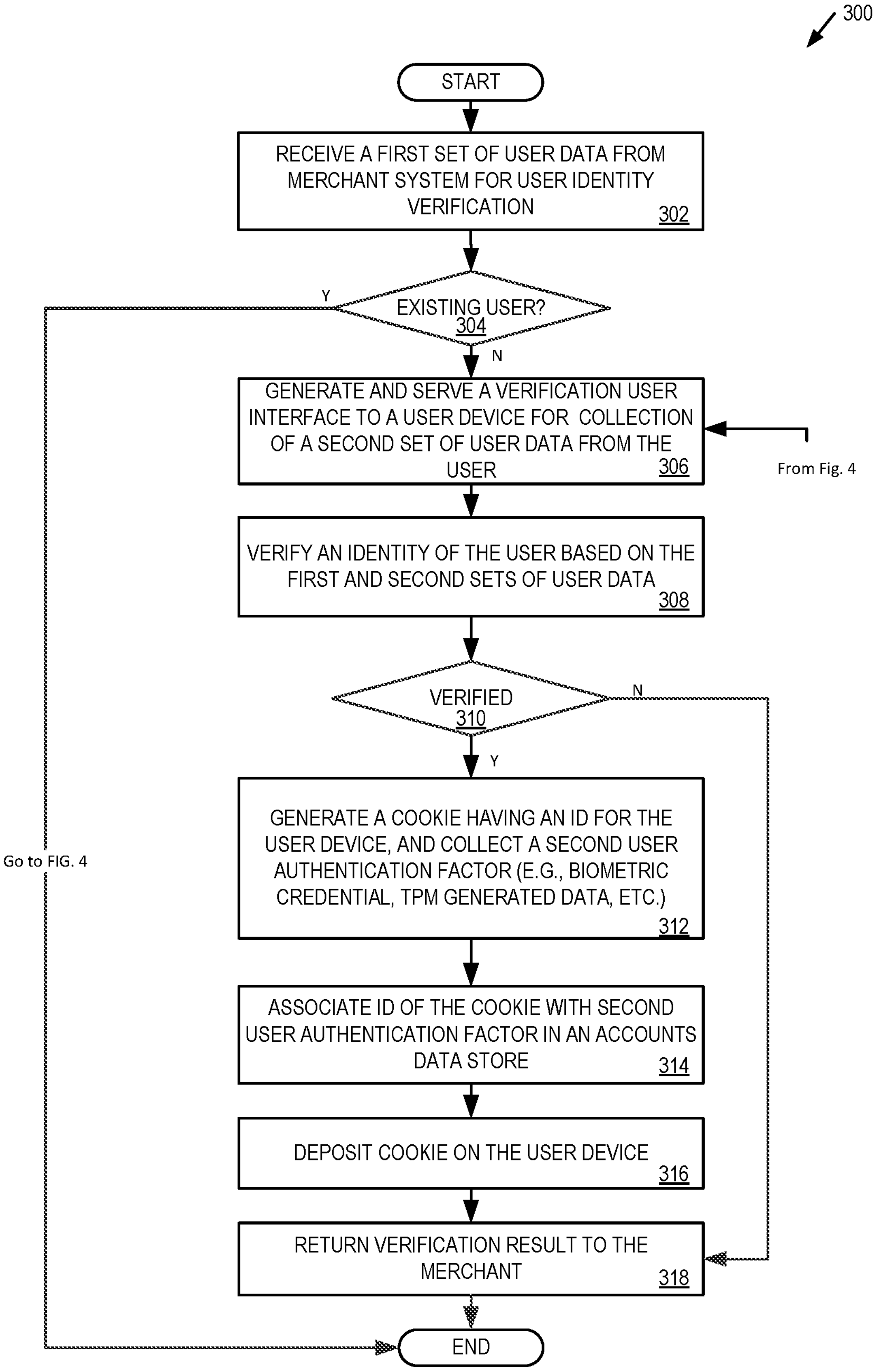
FIG. 3 is a block diagram of an embodiment of a commerce platform performing identity verification for a new user of a merchant system including enabling identity verification reuse for the new user.

FIG. 3 is a block diagram of an embodiment of a commerce platform performing identity verification for a new user of a merchant system including enabling identity verification reuse for the new user. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., system 110 or 210).

Referring to FIG. 3, processing logic begins by receiving a first set of user data from a merchant system for user identity verification (processing block 302). As discussed herein, the first set of user data may be received while the user is being onboarded to the merchant system, as well as to a commerce platform, which provide financial processing services to the merchant system. Furthermore, the first set of user data may be a minimal set of user data, such as name, birthdate, phone number, etc., or a combination of one or more user data. Additionally, due to the sensitive nature of the exchanged data, all data exchanges performed by processing logic occur over secure channels and/or using secure protocols for the exchange of information.

Processing logic then determines, from the first set of data when comparing to data in a database of user accounts, whether the user is an existing user (processing block 304). In embodiments, the existing user is deemed to be "existing" for identity verification purposes when the account with matching information also has a device cookie ID that is associated with a second authentication factor (e.g., the account includes an enrolled device for identity authentication reuse). When the user is an existing user, the process advances to the process discussed in FIG. 4 below. However, when the user is not an existing user, the process advances to processing block 306.

Processing logic generates and serves a verification user interface to a user device for collection of a second set of user data from the user (processing block 306). The user interface may be a web based user interface, data to populate a mobile app of a merchant system, etc. Furthermore, the user interface may be communicated to a user device based on API based messaging, where a merchant web page, merchant app, etc. integrates API functions of a commerce platform enabling the merchant web page, mobile app, etc. to generate content requests, and receive response from processing logic.

Processing logic uses the first and second sets of user data to verify an identity of the user (processing block 308). As discussed herein, processing logic may communicate, via secure protocols and/or channels, the combined user data to a third party verification service, which performs identity verification using public and/or private data sources. However, in embodiments, processing logic of the commerce platform may perform the identity verification. Furthermore, as discussed herein, the likelihood of successful verification may also be configured by a merchant system. Thus, when an identity verification service provides a score that a verification result is correct (e.g., 50% likely to be a positive verification, 95% likely to be a positive verification, etc.), the identity verification score may be used by processing logic when determine if user identity is verified. For example, a first merchant may be satisfied with a moderate likelihood of positive identity verification, whereas a second merchant may require a high likelihood positive identity verification. That is, in embodiments, each merchant may configure a threshold, level, percentage, etc. which is used to compare against an identity verification result prediction, and the verification result based on that comparison. This enables merchants to control the risk each is willing to accept in identity verification.

When verification is negative, and the first and second sets of user data are not verified as proving a purported identity of the user (e.g. from the first set of user data), processing logic returns a negative result (processing block 316) to the user device as well as to the merchant for which the user is being onboarded. The merchant system may then reinitiate identity verification by returning to block 302.

When verification is positive, processing logic generates a cookie having an identifier for the user device, and collects a second user authentication factor (e.g., biometric credential, TPM generated data, etc.) (processing block 312). The ID for the device cookie is a unique data that identifies the user device as a device belonging the user whose identity was verified. Processing logic associates the ID from the cookie with the second user authentication factor in an accounts data store (processing block 314), and deposits the cookie on the user device (processing block 316). After the cookie is deposited, the user identity authentication reuse for the user is enabled for future enrollments with additional merchant systems, as discussed in FIG. 4 below. Furthermore, in embodiments, data from the second set of user data collected by processing logic may be provided to the merchant system as user account data so that a user need not provide duplicate data for any further merchant system onboarding.

Processing logic may then return a positive identity verification result to the user (e.g., at user device) and to the merchant system to which the user is being onboarded (processing block 318).

Figure 4:
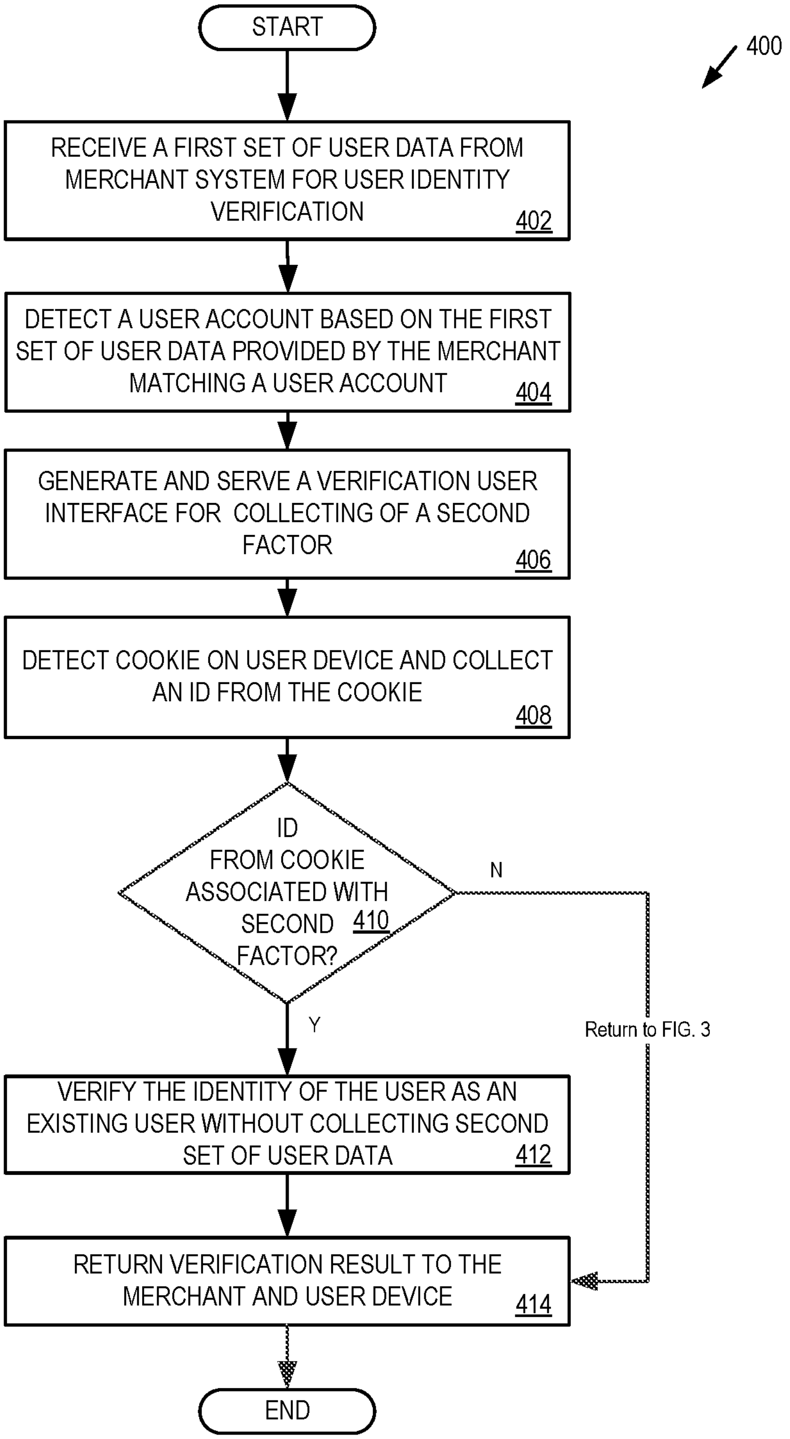
FIG. 4 is a flow diagram of one embodiment of a method of a commerce platform system leveraging a prior user identity verification to securely and efficiently verify an identity of an existing user for a new merchant system.

FIG. 4 is a flow diagram of one embodiment of a method 400 of a commerce platform system leveraging a prior user identity verification to securely and efficiently verify an identity of an existing user for a new merchant system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., system 110 or 210).

Referring to FIG. 4, processing logic begins by receiving a first set of user data from a merchant system for identity verification (processing block 402). In embodiments, the merchant system is a second merchant system, since the user has been onboarded to a first merchant system as discussed in FIG. 3 above. Processing logic detects a user account of a user based on the first set of user data provided by the merchant matching user data in a user account (processing block 404). That is, processing determines that a commerce platform system user account with matching user data exists, indicating that the user has previously established an account with the commerce platform.

Processing logic generates and serves a verification user interface for collecting of a second authentication factor (processing block 406). The second authentication factor is data generated by the user device, such as a biometric signature, TPM checksum, etc. Processing logic further detects a cookie on the user device and collects an ID from the cookie (processing block 408).

Processing logic then determines whether the ID collected from the cookie is associated with the second factor (processing block 410). That is, processing logic determines whether the identity verification reuse has been enabled. When it has not, processing logic returns to block 306 FIG. 3. However, when the device's cookie ID is determined to be associated with the second authentication factor in an accounts data store at the commerce platform, processing logic verifies the identity of the user as an existing user without collecting a second set of user data (processing block 412). That is, processing logic leverages the association of the device cookie ID with the second authentication factor as a confirmation that the user has previously and successfully performed identity verification using the device on which they are currently using, which provides a guarantee of trust in the prior identity verification as being valid for the current verification. The verification result is then returned to the merchant and the user device (processing block 414).

Figure 5:
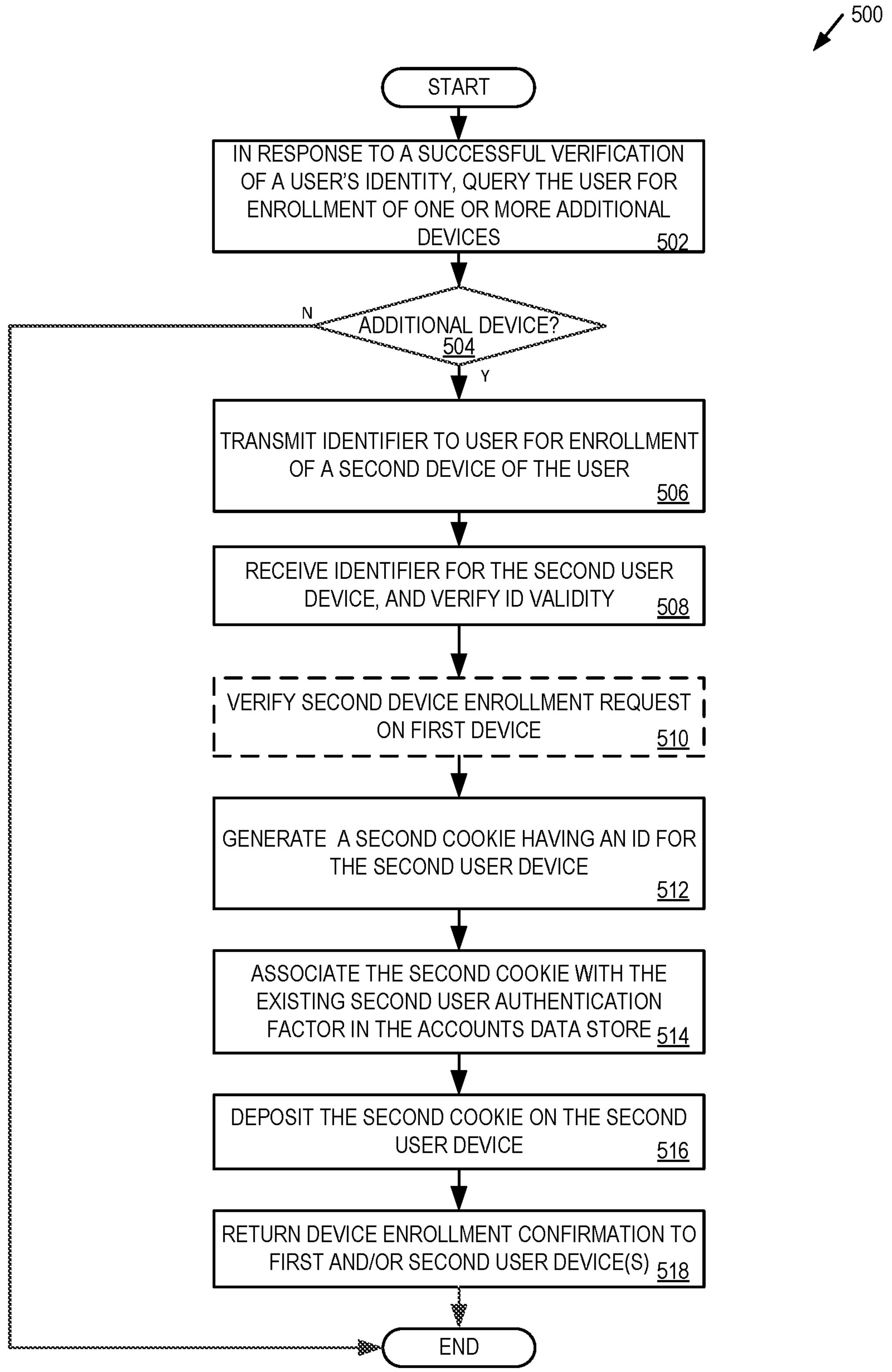
FIG. 5 is a flow diagram of an embodiment of a method for enrolling a second user device for identity verification reuse by a commerce platform.

FIG. 5 is a flow diagram of an embodiment of a method 500 for enrolling a second user device for identity verification reuse by a commerce platform. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform system (e.g., system 110 or 210).

Referring to FIG. 5, processing logic in response to a successful verification of a user's identity (e.g. FIG. 3 and/or FIG. 4), query the user for enrollment of one or more additional devices (processing block 502). In embodiments, a user that successfully performed identity verification may further enroll other devices (e.g. enroll their computer, mobile device, smart wearables, etc.). If the user does not specify an additional device (e.g. provide a second user device identifier, email address, etc. for enrolling the other device) indicating an intent to enroll the second device (processing block 504), the process ends.

If additional user device(s) ae specified (processing block 504), processing logic transmits an identifier to the user for enrollment of a second device (processing block 506). In embodiments, the transmission may be an email with a link having the identifier embedded therein and which resolves at the commerce platform, may be a text, MMS, SMS, or other message with the link having the identifier embedded therein, or other communication.

Processing logic then receives the identifier form the second user device and verifies the ID's validity (processing block 508). The ID may be received when the link is selected, and parsed from an address (e.g., request received at a web server when a user device selects a link, and the ID parsed from the selected link). Furthermore, as discussed herein, the ID may be associated with a validity period or usage limit, which is verified as still being valid.

Processing logic optionally verifies second device enrollment request on a first device of the user (processing block 510). For example, a text message, email, instant message, etc. may be sent by processing logic to a first, enrolled user device querying whether the user initiated the second user device enrollment. This may be done to enhance security, and in the event a nefarious actor seeks to improperly use a prior identity verification of a user.

Processing logic then generates a cookie having an ID for the second user device (processing block 512). The ID may be the same ID as used in the device cookie deposited at the first user device, or may be different. In an embodiment, the ID from the device cookie for the second device is then associated with the existing second user authentication factor in the accounts data store (processing block 514). However, in other embodiments, a second authentication factor is collected from the second user device, and associated with the ID. That is, the second user device may have different capabilities, have its own TPM, etc. leading to the collection of a second authentication factor to be associated with the second user device, and cookie ID for the second user device.

Processing logic then deposits the second cookie on the second user device (processing block 516), and returns a device enrollment confirmation to the first and/or second user device(s) 518.

As discussed herein, the identity verification reuse results in several benefits. For example, user experience is improved by reducing user enrollment time on subsequent merchant enrollments that include identity verification. As another example, bandwidth consumption is also reduced by eliminating the need to capture and transfer of large files (e.g. images of documents, IDs, etc.) to/from user of a user device, the commerce platform, an optional identity service, etc. Similarly, enrollment duration at subsequent merchants is also reduced, leading to reduced consumption of compute time, reduced bandwidth usage, etc. by both the merchant systems and commerce platform. Additionally, sensitive user data exposure is reduced by enabling secure identity verification reuse eliminating a user's need to transmit sensitive information multiple times (e.g., for each subsequent verification).

Figure 6:
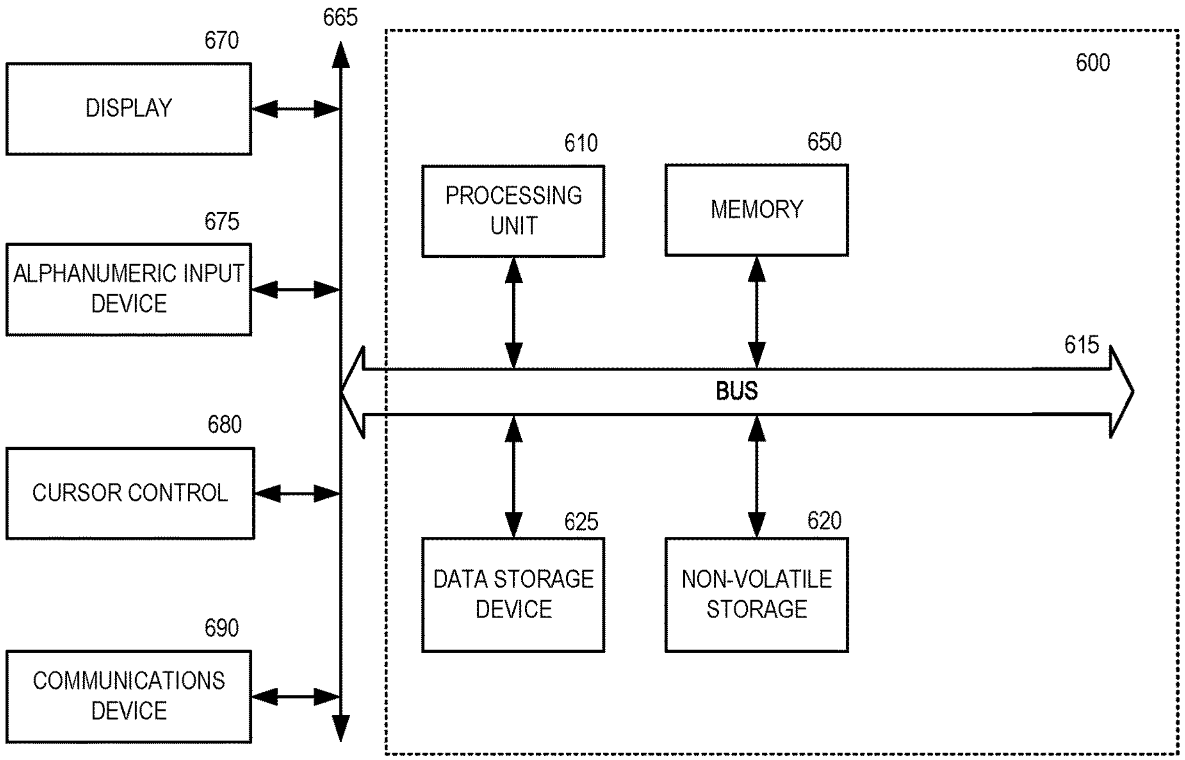
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform, a merchant system, user device, etc. It will be apparent to those of ordinary skill in the art, however, that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
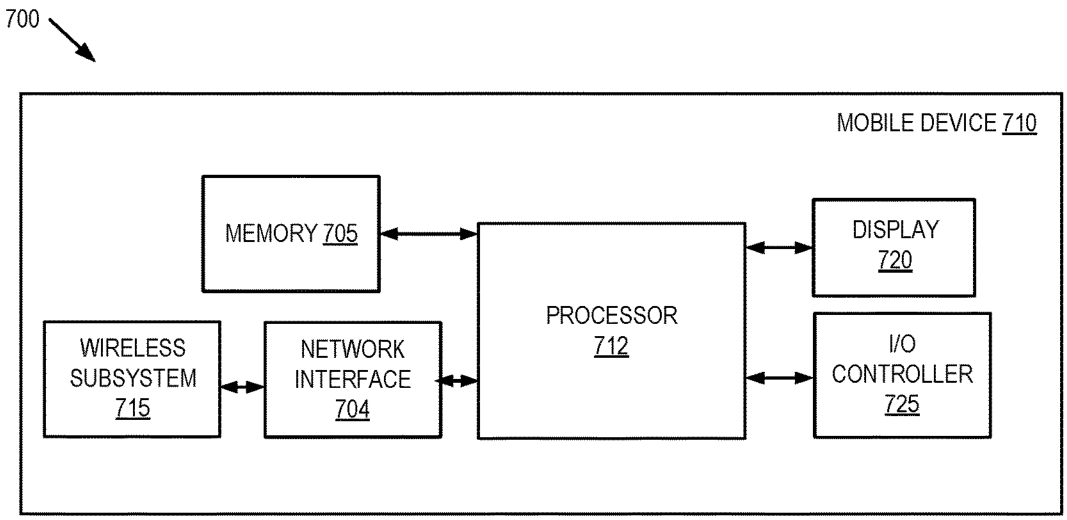
FIG. 7 is one embodiment of a mobile device that may be used to support the systems and operations discussed herein.

FIG. 7 is block diagram of one embodiment 700 of a mobile device. Mobile device 710 may be used, for example, as one or more of the user device(s) 130 or 270 when interacting with the commerce platform system as discussed above.

In one embodiment, mobile device 710 is a system, which may include one or more processors 712, a memory 705, VO controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through VO controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for electronic authentication of multiple devices using a single verification to provide secure and efficient identity verification reuse, the method comprising:

receiving, by a computing system, a first set of user data associated with a user of a first system to verify an identity of the user;

receiving, by the computing system, a second set of user data associated with the user of the first system to verify a purported identity of the user;

verifying, by the computing system, the purported identity of the user as a true identity of the user based on the first set of user data and the second set of user data;

in response to a positive verification of the true identity of the user, generating, by the computing system, a first cookie comprising a first identifier of the user and collecting a first authentication factor generated by a first user device, wherein the first identifier of the first cookie is associated with the first authentication factor for identity verification reuse;

depositing, by the computing system, the first cookie on the first user device;

storing, by the computing system, the first authentication factor with the first identifier in an accounts data store, wherein the first authentication factor and the first identifier are associated with the user;

transmitting, by the computing system to the first system, an identity verification result confirming the true identity of the user and a query for enrollment of a second user device;

in response to receiving consent from the user to enroll the second user device, transmitting, by the computing system, a link embedded with a second identifier to the second user device for enrollment of the second user device; and in response to detecting, by the computing system, selection of the link by the second user device:

generating, by the computing system, a second cookie comprising the first identifier;

collecting, by the computing system, a second authentication factor from the second user device;

storing, by the computing system, the first identifier with the second authentication factor in the accounts data store, wherein the second authentication factor and the first identifier are associated with the user in the accounts data store;

depositing, by the computing system, the second cookie comprising the first identifier on the second user device;

in response to a subsequent request to verify the second user device from a second system, collecting, by the computing system, a third cookie and a third authentication factor from the second user device; and verifying, by the computing system, the second user device based on the third cookie and the third authentication factor, wherein verifying the second user device comprises:

in response to determining that the third cookie comprises the first identifier and the third authentication factor matches the second authentication factor associated with the first identifier in the accounts data store:

verifying, by the computing system, the purported identity of the user of the second user device as the true identity of the user; and transmitting, by the computing system to the second system, a second identity verification result confirming the true identity of the user.

2. The method of claim 1, wherein the second identifier is generated with a validity period, wherein the validity period comprises a validity time, a number of identifier uses, or a combination thereof, and the method further comprises:

determining whether the second identifier is received within the validity period; when the second identifier is received within the validity period, enrolling the second user device; and when the second identifier is not received within the validity period, generating a third identifier that is transmitted to the second user device.

3. The method of claim 1, wherein transmitting the link embedded with the second identifier comprises:

transmitting the link that resolves at the computing system, the link comprising the second identifier;

detecting link selection at the computing system; and parsing the link selection to extract the second identifier from the link.

4. The method of claim 1, wherein the second identifier is identical to the first identifier.

5. The method of claim 1, wherein the first identifier of the first cookie is a unique identifier associated with the first user device and identifies the user.

6. The method of claim 1, wherein the first set of user data is received from the first user device by an application of the first system, the method further comprising:

generating, by the computing system, a verification user interface; and serving, by the computing system, the verification user interface to the first user device of the user for collection of the second set of user data from the user.

7. The method of claim 1, wherein verifying, by the computing system, the purported identity of the user, comprises:

transmitting, by the computing system, the first set of user data and the second set of user data to an identity verification service, the identity verification service to process the first set of user data and the second set of user data to determine whether the purported identity of the user is the true identity of the user;

receiving the identity verification result associated with the purported identity of the user from the identity verification service, the identity verification result being a positive identity verification, a negative identity verification, or a scored identity verification, the scored identity verification indicative of a likelihood of the positive identity verification; and verifying the true identity of the user based on the identity verification result received from the identity verification service.

8. The method of claim 7, further comprising:

receiving, by the computing system from the first system prior to verification of the identity of the user, an identity verification configuration that defines at least a minimum verification score acceptable to the first system when verifying user identities;

receiving the scored identity verification from the identity verification service; comparing the scored identity verification with the identity verification configuration received from the first system; and verifying the true identity of the user based on a result of the comparison of the scored identity verification with the identity verification configuration received from the first system.

9. The method of claim 7, wherein the computing system comprises the identity verification service.

10. The method of claim 7, wherein the identity verification service comprises a remote computer processing system.

11. The method of claim 1, wherein the first set of user data comprises a minimum set of user data that identifies the user of the first user device, and wherein the second set of user data comprises additional user data sufficient for verification of the true identity of the user.

12. The method of claim 11, wherein the first set of user data comprises: (1) a user name and a user birthdate or (2) the user name and a user address; and wherein the second set of user data comprises at least a user name of the user at the computing system, an email address, or a telephone number.

13. The method of claim 1, wherein the first authentication factor comprises one of a biometric signature collected using a biometric sensor of the first user device, data generated by a trusted platform module of the first user device, or data generated by a software application installed on the first user device.

14. A non-transitory computer readable storage medium including instructions that, when executed by a processor, cause the processor to perform operations comprising:

receiving, by a computing system, a first set of user data associated with a user of a first system to verify an identity of the user;

receiving, by the computing system, a second set of user data associated with the user of the first system to verify a purported identity of the user;

verifying, by the computing system, the purported identity of the user as a true identity of the user based on the first set of user data and the second set of user data;

in response to a positive verification of the true identity of the user, generating, by the computing system, a first cookie comprising a first identifier of the user, and collecting a first authentication factor generated by a first user device of the user, wherein the first identifier of the first cookie is associated with the first authentication factor for identity verification reuse;

depositing, by the computing system, the first cookie on the first user device of the user;

storing, by the computing system, the first authentication factor with the first identifier in an accounts data store, wherein the first authentication factor and the first identifier are associated with the user;

transmitting, by the computing system to the first system, an identity verification result confirming the true identity of the user and a query for enrollment of a second user device;

in response to receiving consent from the user to enroll the second user device, transmitting, by the computing system, a link embedded with a second identifier generated by the computing system to the second user device for enrollment of the second user device for identity verification reuse; and in response to detecting, by the computing system, selection of the link by the second user device:

generating, by the computing system, a second cookie comprising the first identifier;

collecting, by the computing system, a second authentication factor from the second user device;

storing, by the computing system, the first identifier with the second authentication factor collected from the second user device in the accounts data store;

depositing, by the computing system, the second cookie comprising the first identifier on the second user device;

in response to a subsequent request to verify the second user device from a second system, collecting, by the computing system, a third cookie and a third authentication factor from the second user device; and verifying, by the computing system, the second user device based on the third cookie and the third authentication factor, wherein verifying the second user device comprises:

in response to determining that the third cookie comprises the first identifier and the third authentication factor matches the second authentication factor associated with the first identifier in the accounts data store:

verifying, by the computing system, the purported identity of the user of the second user device as the true identity of the user; and transmitting, by the computing system to the second system, a second identity verification result confirming the true identity of the user.

15. The non-transitory computer readable storage medium of claim 14, wherein transmitting the link comprises:

transmitting the link that resolves at the computing system, the link comprising the second identifier;

detecting link selection at the computing system; and parsing the link selection to extract the second identifier from the link.

16. The non-transitory computer readable storage medium of claim 14, wherein the first set of user data is received from the first user device by an application of the first system, further comprising:

generating, by the computing system, a verification user interface; and serving, by the computing system, the verification user interface to the first user device of the user for collection of the second set of user data from the user.

17. The non-transitory computer readable storage medium of claim 14, wherein verifying, by the computing system, the purported identity of the user, comprises:

transmitting, by the computing system, the first set of user data and the second set of user data to an identity verification service, the identity verification service to process the first set of user data and the second set of user data to determine whether the purported identity of the user is the true identity of the user;

receiving the identity verification result associated with the purported identity of the user from the identity verification service, the identity verification result being a positive identity verification, a negative identity verification, or a scored identity verification, the scored identity verification indicative of a likelihood of the positive identity verification; and verifying the true identity of the user based on the identity verification result received from the identity verification service.

18. The non-transitory computer readable storage medium of claim 17, further comprising:

receiving, by the computing system from the first system prior to verification of the identity of the user, an identity verification configuration that defines at least a minimum verification score acceptable to the first system when verifying user identities;

receiving the scored identity verification from the identity verification service; comparing the scored identity verification with the identity verification configuration received from the first system; and verifying the identity of the user based on a result of the comparison of the scored identity verification with the identity verification configuration received from the first system.

19. The non-transitory computer readable storage medium of claim 14, wherein the first set of user data comprises a minimum set of user data that identifies the user of the first user device, and wherein the second set of user data comprises additional data sufficient for verification of the true identity of the user.

20. The non-transitory computer readable storage medium of claim 19, wherein the first set of user data comprises: (1) a user name and a user birthdate or (2) the user name and a user address; and wherein the second set of user data comprises at least a user name of the user at the computing system, an email address, or a telephone number.

21. The non-transitory computer readable storage medium of claim 14, wherein the first authentication factor comprises one of a biometric signature collected using a biometric sensor of the first user device, data generated by a trusted platform module of the first user device, or data generated by a software application installed on the first user device.

22. The non-transitory computer readable storage medium of claim 14, wherein the first identifier of the first cookie is a unique identifier associated with the first user device and identifying the user.

23. A system, comprising:

a memory; and a processor coupled with the memory configured to:

receive a first set of user data associated with a user of a first system to verify an identity of the user;

receive a second set of user data associated with the user of the first system to verify a purported identity of the user;

verify the purported identity of the user as a true identity of the user based on the first set of user data and the second set of user data;

in response to a positive verification of the true identity of the user, generate a first cookie comprising a first identifier, and collect a first authentication factor generated by a first user device of the user, wherein the first identifier of the first cookie is associated with the first authentication factor for identity verification reuse;

deposit the first cookie on the first user device of the user;

store the first authentication factor with the first identifier in an accounts data store, wherein the first authentication factor and the first identifier are associated with the user, transmit, to the first system, an identity verification result confirming the true identity of the user and a query for enrollment of a second user device;

in response to receiving consent from the user to enroll the second user device, transmit a link embedded with a second identifier to the second user device for enrollment of the second user device; and in response to detecting, selection of the link:

generate a second cookie comprising the first identifier;

collect a second authentication factor from the second user device;

store the first identifier with the second authentication factor collected from the second user device in the accounts data store, wherein the second authentication factor and first identifier are associated with the user;

deposit the second cookie comprising the first identifier on the second user device;

in response to a subsequent request to verify the second user device from a second system, collect a third cookie and a third authentication factor from the second user device; and verify the second user device based on the third cookie and the third authentication factor, wherein verifying the second user device comprises:

in response to determining that the third cookie comprises the first identifier and the third authentication factor matches the second authentication factor associated with the first identifier in the accounts data store:

verify the purported identity of the user of the second user device as the true identity of the user; and transmit, to the second system, a second identity verification result confirming the true identity of the user.

* * * * *